United States Patent
Bott

[11] 3,863,415
[45] Feb. 4, 1975

[54] AWNING OR MARQUEE

[76] Inventor: Winston F. Bott, 1915 N. Lexington Blvd., Corpus Christi, Tex. 78409

[22] Filed: Aug. 22, 1972

[21] Appl. No.: 282,866

[52] U.S. Cl. .................................... 52/630, 52/77
[51] Int. Cl. ........................... E04c 2/32, E04b 1/34
[58] Field of Search ..................... 52/74–78, 618, 52/630, 537, 538; 161/135, 133; D21/6 R, 6 B, 6 C; D13/1 D; D68/1

[56] References Cited
UNITED STATES PATENTS
3,151,947 10/1964 Hasting ................................ 52/630
3,674,620 7/1972 McCarthy ........................... 161/133

FOREIGN PATENTS OR APPLICATIONS
551,742 10/1956 Belgium ............................... 52/537

Primary Examiner—John E. Murtagh

[57] ABSTRACT

An awning or marquee for a storefront or other building, wherein the awning is formed of fiberglass or other molded material and has a plurality of partial conical sections, with the alternate sections tapering in the opposite directions to provide substantially equal upper and lower lengths for the awning, and with the alternate sections being of a different radius from those sections adjacent thereto to provide a composite awning structure which has adequate strength to resist normal wind loads for a particular area of use and without requiring extensive supporting structure, whereby an attractive, lightweight, economical and structurally strong awning or marquee for a storefront or other building is provided.

14 Claims, 5 Drawing Figures

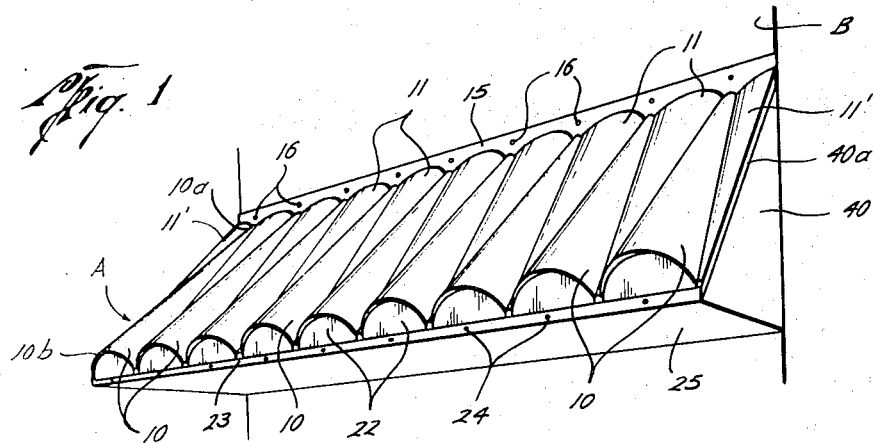
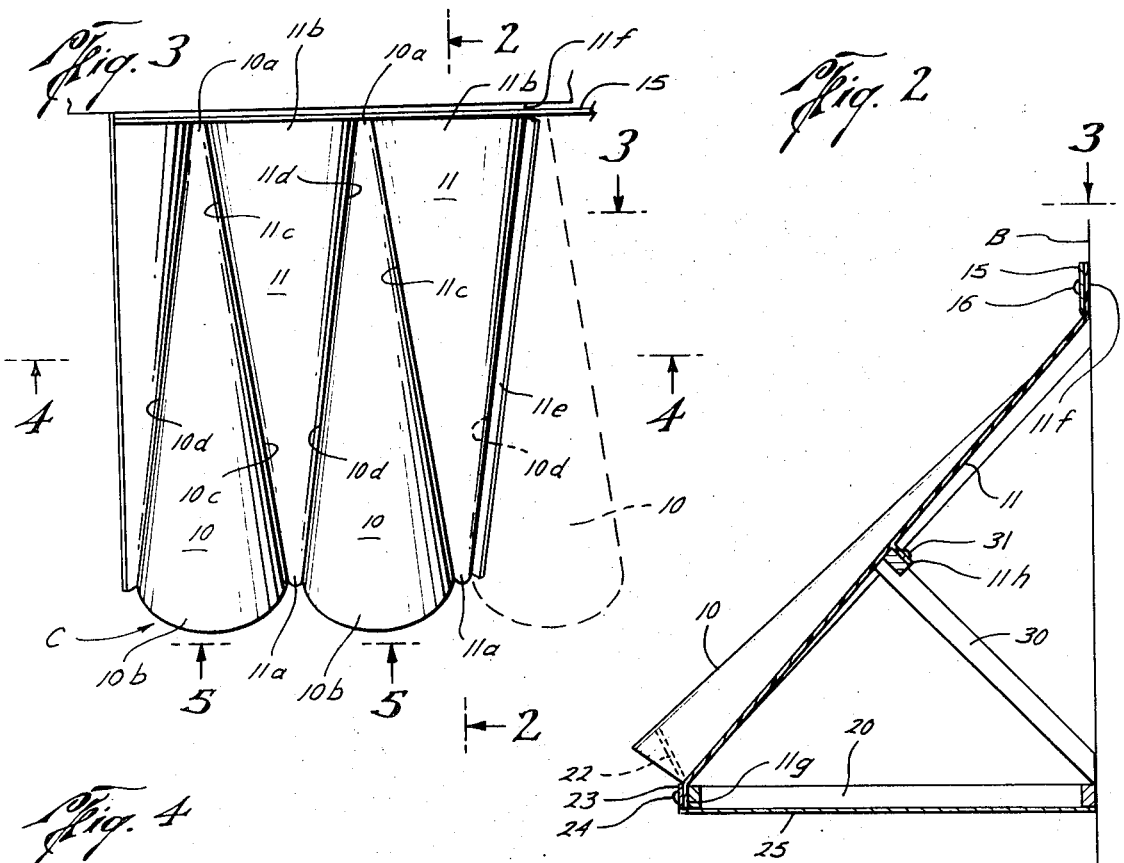
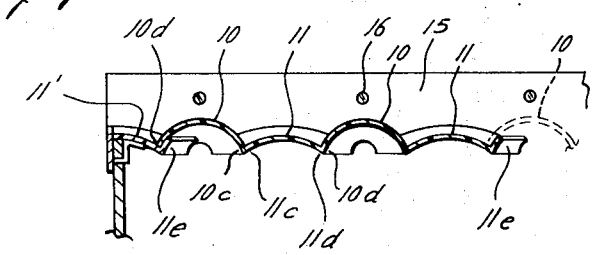
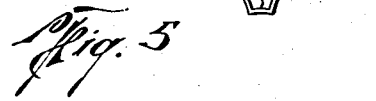

AWNING OR MARQUEE

BACKGROUND OF THE INVENTION

The field of this invention is awnings or marquees for storefronts and other buildings.

Stationary awnings or marquees for storefronts and other buildings have traditionally been of relatively heavy materials and have required extensive supporting structures such as cantilever beams from the building and tension rods, all of which has contributed to relatively high costs for such installations. The prior structures made of lighter weight materials have generally been unsatisfactory, so far as known, due to an inadequate strength to resist wind loads and other forces from different directions.

SUMMARY OF THE INVENTION

The present invention relates to a stationary awning or marquee which is lightweight and is of adequate strength to resist normal wind forces and other forces without requiring extensive supporting structure. The awning is made of fiberglass or other molded material and it has a plurality of partial conical sections, with the alternate sections tapering in the opposite directions, and preferably being of a different radius from those sections adjacent thereto. The first alternately disposed sections have a radius of curvature to provide resistance from uplift or wind forces while the second sections which are alternately disposed between the first sections have a larger radius of curvature than said first sections and a small enough segment of a cone to provide resistance to lateral winds and other lateral forces.

BRIEF DESCRIPTION OF THE DRAWINGS

FIG. 1 is an isometric view of the awning of this invention mounted on a storefront or building;

FIG. 2 is a sectional view taken on line 2—2 of FIG. 3, illustrating further details of the awning of this invention;

FIG. 3 is a view taken on line 3—3 of FIG. 2 and illustrating in solid lines a panel assembly or unit forming a part of the complete awning of FIG. 1, with the remainder of the awning being partially indicated by the dotted lines therein;

FIG. 4 is a sectional view taken on line 4—4 of FIG. 3 to further illustrate the construction of the awning of this invention, and particularly the unit or assembly illustrated in solid lines in FIG. 3; and FIG. 5 is a view taken on line 5—5 of FIG. 4.

DESCRIPTION OF THE PREFERRED EMBODIMENT

In the drawings, the letter A designates generally the awning or marquee of this invention which is adapted to be mounted upon a storefront or building generally designated B. As will be explained in detail, the awning A is preferably pre-formed in a plurality of units C, one of which is illustrated in solid lines in FIG. 3 and which are joined together to form the complete awning A as illustrated in FIG. 1. Each of the units C is pre-molded or formed from fiberglass or a similar molded material to the configuration illustrated in the drawings. In the assembly of such units C to form the awning A, the longitudinal edges of the adjacent units are bonded or are otherwise connected together to form a unitary awning A which requires a minimum of support on the building B. Although the awning A is very light in weight as compared to conventional awnings or marquees on storefronts and other buildings, it is nevertheless structurally strong enough to withstand wind loads encountered under most conditions and it further presents an attractive appearance for many years.

Considering the invention more in detail, the awning A includes a plurality of first partially conical molded sections 10, each of which is preferably identical as illustrated in the drawing.

Each of the sections 10 is disposed with its smaller portion at its upper end 10a and with its larger portion at its lower end 10b. A plurality of partial conical second sections 11 are disposed between the first sections 10 and are either formed integrally therewith or are joined thereto, as will be more fully explained. Each second section 11 has its smaller portion 11a at its lower end to fit between the larger ends 10b of the first sections 10. Each of the second sections 11 has its larger portion 11b at its upper end disposed between the smaller upper ends 10a of the sections 10.

In the preferred embodiment of this invention, a unit or assembly C, as illustrated in solid lines in FIG. 3, is preferably first molded from fiberglass so as to form two of the first sections 10 and two of the second sections 11 as a single assembly and intregal with each other. Thus, as viewed in FIG. 3, the first section 10 on the left and the second section 11 to the right thereof have their common intersecting longitudinal edges 10c and 11c formed together. Similarly, the opposite longitudinal edge 11d is formed intergally with and intersects with the longintudinal edge 10d of the section 10 to the right of the section 11 adjacent thereto. In the panel or unit C, such section 10 may be considered the third section. The next section 11 to the right of the third section 10 in the panel C may be considered the fourth section in the panel and it has an edge 11c which is joined to the edge 10c of the section 10 adjacent thereto in the same manner as heretofore described. The series of intersecting conical surfaces of the sections 10 and 11 thus described form a stressed-skin structure inasmuch as the edges of all of the surfaces are restrained, each by the other, thus enabling the surfaces themselves to act as structural members.

When forming the complete awning A, a plurality of the units or assemblies C are joined together and for this purpose, an overlapping strip 11e is formed along the edge of the fourth or right hand section 11 in each of the units C for overlapping and joining to the edge 10d of the first section 10 in line and adjacent thereto. Such joining may be accomplished by bonding with any suitable known bonding agent for fiberglass and this is preferably done during the mounting of the units C as they are successively placed in position to form the awning A on the storefront or building B. The overlapping of the longitudinal edge 11e at the edge 10d of section 10 is illustrated in FIG. 4 of the drawings.

It should be noted that at the ends of the awning A, half sections 11' are utilized so that the ends of the awning are squared off and are substantially perpendicular to the upper and lower edges of the awning A. Such half sections 11' are cut from a section 11 and are secured to the adjacent sections 10 by bonding or other suitable means, as previously explained in connection with the joining of the adjacent units or assemblies C to each other.

An important feature of the present invention resides in the construction of the alternate first section 10 with a lesser or smaller radius of curvature than the second sections 11. Also, the sections 10 are close to being a semi-circular cross section of a cone, but preferably they are not formed as a full semi-circular conical section. In the preferred embodiment, the middle ordinate or the maximum depth of each of the conical sections 10 is from about 80 to about 90 percent of the radius of the complete cone from which the measurements are calculated.

The second sections 11, on the other hand, have a much flatter configuration which is provided by forming them with a greater radius and by using only a small section of such radius. For example, the middle ordinate or the maximum depth of the conical section in each of the sections 11 is preferably only about 10 to 15 percent of the radius of the cone from which the sections 11 are designed or are calculated. By reason of such construction, the adjacent surfaces of the sections 10 and 11 which meet at, for example, longitudinal edges 10c and 11c (FIG. 4) are at substantially a right angle, thus providing the properties of a structural angle to the portions of the mating or adjacent surfaces of the sections within a few inches of the line of such intersection. Such structural angle provides the maximum strength at such corner or longitudinal intersection and increases the strength of the entire awning even though the fiberglass itself is relatively light and thin. The fiberglass may of course be thickened to further strengthen the junction between the sections 10 and 11.

The larger curvature of the sections 10, which approaches a semi-circular cross section, provides the principal strength of the awning A to resist wind loads and particularly uplift negative pressure loads that would tend to bend the structure downwardly or upwardly when mounted on the building B.

The flatter or shallower second sections 11 provide the principal strength to resist shearing and/or bending stresses in the lateral direction that would be caused by strong wind loads from either side of the building rather than from the front of the building.

By constructing the alternate sections 11 with a shallower or flatter configuration as previously explained, not only is the right angle intersection provided as discussed above, but additionally, at the lower ends 10b of the sections 10, they are joined together by the smaller lower portion 11a of the section 11 therebetween in approximately a channel shape as illustrated in FIG. 5 to provide a very strong structural connection between the adjacent sections 10.

It should be noted that the sections 11, although approaching flatness, are not flat but are curved and have the flattened conical shape. A completely flat shape for the sections 11 would be structurally unsatisfactory because it would cause the awning to lose its stiffness due to the buckling, warping and bending of the sections 11 under wind loads. The slight to moderate curvature of the sections 11 of the awning A of this invention provides the required stiffness to the entire awning A by enabling it to act as a thin-shell structural member along with the structural sections 10.

The awning A of this invention is not only pleasing and decorative, but it may also be formed in different colors which are permanent and which will last for many, many years. Thus, the sections 10 may be formed of one color such as red while the alternate sections 11 may be formed of another color such as white to give a very pleasing effect. Additionally, from a structural standpoint, the awning A is strong enough in itself to be an essentially self supporting member which can be mounted with very little under-support to the building B. Conventional structural members such as joists, rafters, strusses, purlines, beams and the like are eliminated and a relatively light weight support as illustrated in FIG. 2 drawings may be utilized. Thus, as shown in FIG. 2, a connecting upper strip 15 also formed of fiberglass is bonded or is otherwise connected to the sections 10 and 11. Such strip 15 may be directly connected to such sections 10 or it may be a cover strip extending for the full width of the awning A and fitting over other strips such as 11f (FIG. 2) which are formed integrally with each of the sections 11. Nails, screws, or other fastening means 16 are used for joining the strip 15 and the strips 11f to the building B.

For holding the lower end of the awning A away from the building B and for properly positioning it at the desired angle with respect to the vertical surface of the building B, a lightweight framework 20 (FIG. 2) is provided which is attached in any suitable manner to the building B and which is adapted to receive the lower ends of the sections 10 and 11 as illustrated. A strip 11g may be formed with each of the sections 11 at its lower end for fastening to the outer portion of the frame 20 although such strips 11g are not necessary. Cover plates 22 (FIGS. 1 and 2) having the general configuration of the openings in the sections 10 at their lower ends and also having a downwardly extending strip 23 therewith are disposed so as to close the open lower ends of the sections 10 and to connect same to the frame 20 by means of nails, screws or other fastening means 24. It will be appreciated that variations in the mounting of the enclosure plates 22 may be made since such enclosure plates 22 are provided solely for decorative purposes, although they may be secured to the sections 10 and assist in the connection with the frame 20 if desired.

A soffit or lower cover 25, preferably also formed of fiberglass is disposed below the framework 20 so as to provide a pleasing appearance below the awning A.

For additional support, a plurality of inclined braces 30 may be mounted from the building B to an intermediate point on the sections 11, where a downwardly extending tab 11h is preferably formed for such connection. Each tab 11h is joined to one of the braces 30 by a screw, nail or any suitable fastening means 31 (FIG. 2). Such bracing is further support for the awning A against wind loads, although such bracing is not essential with the awning A of this invention in its normal construction and for normal wind loads.

The awning A is preferably closed off by an end section at each end of the awning A (FIG. 1) which is likewise preferably formed of fiberglass material and which fills in a substantially triangular space at each end of the awning, joining the upper edge 40a to the end section 11' adjacent thereto. Thus, the final awning A is fixed to the building B and it has a solid appearance because of the soffit 25 and end covers 40, so that it has a very pleasing and attractive appearance from any angle.

Although the invention has been described herein as preferably utilizing four sections, namely, two sections 10 and two sections 11 in a single panel or unit C for manufacturing purposes, it will be understood that the invention is not limited thereto and that more or less of the sections may be preformed initially and subsequently joined together. In fact, the entire awning A can be manufactured as a single unitary assembly, although this is not generally practical in view of the size of the awning A. Although the invention has been described herein, using fiberglass as the molded material, it will be appreciated that other plastics and moldable materials may be utilized providing they have the strength required for the loads encountered in the use of the awning A contemplated by this invention.

The foregoing disclosure and description of the invention are illustrative and explanatory thereof, and various changes in the size, shape and materials, as well as in the details of the illustrated construction, may be made without departing from the spirit of the invention.

I claim:

1. An awning for a building, comprising:
   a first partial conical convex longitudinally extending section formed of a substantially rigid molded material and having its smaller portion at its upper end and its larger portion at its lower end;
   a second partial conical convex longitudinally extending section disposed adjacent and laterally with respect to said first partial conical section with its smaller portion at its lower end adjacent said larger portion of said first section and with its larger portion at its upper end adjacent said smaller portion of said first section;
   said first section and said second section having adjacent longitudinal edges secured together and forming a unitary awning section; and
   said first section having a radius of curvature less than the radius of curvature of said second section whereby said second section is flatter than said first section to resist essentially lateral wind load thereon while the curvature thereof provides strength against bending.

2. The awning set forth in claim 1, including:
   a third partial conical section substantially the same as and disposed in the same position as said first section but on the opposite side of said second section; and
   said second and third section each having an adjacent longitudinal edge secured together for uniting said third section to said second section.

3. The awning set forth in claim 2, including;
   a fourth partial conical section substantially the same as and disposed in the same position as said second section; and
   said third and fourth sections each having an adjacent longitudinal edge secured together for uniting said fourth section to said third section, whereby said first, second, third and fourth sections form a unitary awning assembly.

4. The awning set forth in claim 3, wherein:
   the radius of curvature of said first and third sections is the same; and
   the radius of curvature of said second and fourth sections is the same and is greater than the radius of curvature of said first and third sections.

5. The awning set forth in claim 1, including:
   a plurality of said first conical sections; and
   a plurality of said second conical sections, with one of said second sections disposed alongside each of said first sections.

6. The awning set forth in claim 5, wherein:
   all of said sections are of the same length thereby forming a substantially straight upper edge and a substantially straight lower edge.

7. The awning set forth in claim 1, wherein:
   the surfaces of said sections adjacent to said adjacent longitudinal edges are disposed at substantially a right angle with respect to each other.

8. The awning set forth in claim 5, wherein:
   said lower smaller portion of each of said second sections disposed between a pair of said lower larger portions of said first sections forms a connection therebetween which is substantially in a channel shape.

9. The awning set forth in claim 3, wherein:
   all of said longitudinal edges which are secured together are molded together to form a single unitary assembly of said first, second, third and fourth sections.

10. The awning set forth in claim 4, wherein;
    the middle ordinate of each of said first and third sections is about 80 to 90 percent of the radius of the cone from which first and third sections are calculated; and
    the middle ordinate of each of said second and fourth sections is about 10 to 15 percent of the radius of the cone from which said second and fourth sections are calculated.

11. The awning set forth in claim 1, wherein:
    one of said sections has a longitudinal strip projecting from the longitudinal edge thereof, overlapping and secured to a longitudinal portion of the other of said sections for forming a unitary awning section.

12. The awning set forth in claim 1, further including:
    semicircular cover plates mounted in the larger portion of said first section.

13. The awning set forth in claim 1, wherein:
    the smaller portion of said first section and the larger portion of said second section have a lateral strip.

14. An awning for a building, comprising:
    a first partial conical convex longitudinally extending section formed of a substantially rigid molded material and having its smaller portion at its upper end and its larger portion at its lower end;
    a second partial conical convex longitudinally extending section disposed adjacent and laterally with respect to said first partial conical section with its smaller portion at its lower end adjacent said larger of said first section and with its larger portion at its upper end adjacent said smaller portion of said first section; and
    said first section having a radius of curvature less than the radius of curvature of said second section whereby said second section is flatter than said first section to resist essentially lateral wind load thereon while the curvature thereof provides strength against bending.

* * * * *